United States Patent
Hoelgaard et al.

(10) Patent No.: US 12,025,972 B2
(45) Date of Patent: Jul. 2, 2024

(54) COMPUTER IMPLEMENTED SYSTEM AND METHOD FOR CONTROLLING AND MONITORING A PUMP

(71) Applicant: Grundfos Holding A/S, Bjerringbrp (DK)

(72) Inventors: Thomas Hoelgaard, Aarhus N (DK); Christian Carlsson, Aarhus N (DK); Mikkel Haggren Brynildsen, Nibe (DK); Thomas Asger Hansen, Viborg (DK)

(73) Assignee: Grundfos Holding A/S, Bjerringbro (DK)

(*) Notice: Subject to any disclaimer, the term of this patent is extended or adjusted under 35 U.S.C. 154(b) by 405 days.

(21) Appl. No.: 17/619,915

(22) PCT Filed: Jun. 16, 2020

(86) PCT No.: PCT/DK2020/050172
§ 371 (c)(1),
(2) Date: Dec. 16, 2021

(87) PCT Pub. No.: WO2020/253926
PCT Pub. Date: Dec. 24, 2020

(65) Prior Publication Data
US 2022/0373995 A1 Nov. 24, 2022

(30) Foreign Application Priority Data

Jun. 17, 2019 (DK) .......................... PA 2019 70378
Nov. 22, 2019 (EP) ..................................... 19210925

(51) Int. Cl.
*G06N 20/00* (2019.01)
*G05B 19/416* (2006.01)
*H04L 51/02* (2022.01)

(52) U.S. Cl.
CPC .......... *G05B 19/416* (2013.01); *G06N 20/00* (2019.01); *H04L 51/02* (2013.01); *G05B 2219/43193* (2013.01)

(58) Field of Classification Search
CPC ........ G05B 19/416; G05B 2219/43193; G06N 20/00; H04L 51/02
See application file for complete search history.

(56) References Cited

U.S. PATENT DOCUMENTS

2018/0129181 A1* 5/2018 Kratzer, III ............. G06F 40/30
2018/0299840 A1* 10/2018 Sinha ................. G05B 13/0265
(Continued)

OTHER PUBLICATIONS

Extended European Search Report; European Patent Office; European Application No. 19210925.4; May 8, 2020; 11 pages.
(Continued)

*Primary Examiner* — Mohammad Ali
*Assistant Examiner* — Vincent W Chang
(74) *Attorney, Agent, or Firm* — Taft Stettinius & Hollister LLP (57) ABSTRACT

The present invention relates to a computer implemented system configured for controlling and monitoring of a pump, the system comprising a pump system, at least one sensor providing an operating state data signal representative of a mechanical, fluidicly, electrical operating state and/or other system data of the pump and/or pump system and a control module controlling the mechanical, fluidicly and/or operating state of the pump in response to a received control signal. The invention also comprises a digital twin module being configured for retrieving said operating state data signal and store the data in the IoT data base.

18 Claims, 7 Drawing Sheets

(56) References Cited

U.S. PATENT DOCUMENTS

| | | | |
|---|---|---|---|
| 2019/0179300 A1* | 6/2019 | Cella | G05B 23/0286 |
| 2020/0285225 A1* | 9/2020 | Lankehanumaiah | ......................... |
| | | | G05B 19/4063 |
| 2021/0292025 A1* | 9/2021 | Hahn | B65B 57/00 |
| 2024/0022529 A1* | 1/2024 | Tosun | G06F 40/205 |

OTHER PUBLICATIONS

International Search Report; European Patent Office; International Application No. PCT/DK2020/050172; Sep. 14, 2020; 5 pages.
Written Opinion of the International Searching Authority; European Patent Office; International Application No. PCT/DK2020/050172; Sep. 14, 2020; 8 pages.

* cited by examiner

COMPUTER IMPLEMENTED SYSTEM AND METHOD FOR CONTROLLING AND MONITORING A PUMP

CROSS-REFERENCE TO RELATED APPLICATIONS

This application is a U.S. National Phase of International PCT Application No. PCT/DK2020/050172 filed on Jun. 16, 2020, which claims priority to Danish Patent Application No. PA 2019 70378 filed Jun. 17, 2019 and European Patent Application No. 19210925.4 filed Nov. 22, 2019, each of which are incorporated herein by reference in their entirety.

FIELD OF THE INVENTION

The present invention relates to a method for controlling and monitoring a pump system using a chatbot.

BACKGROUND OF THE INVENTION

The present invention relates to the controlling and monitoring of a pump system.

Controlling and monitoring is an important aspect in the operational running of a pump system. Pump systems are normally manually controlled, using a control device situated in the pump system controlling parts of the pump system. This, however, creates difficulties when the pump is situated in hard to reach places or remote locations. Further, multiple control device are used when a pump system comprises several parts or when add-ons have been added to the pump system.

A pump system may comprises a central pump for pumping a heated liquid around a pipe network, as well as controllable valves controlling the flow. A pump system may also comprise add-ons, referred to as sub-systems, such as water heaters, sensor, valves and the likes. The control of these function is often the responsibility of separate control systems located on the sub-system themselves or in communication with the sub-system.

These pump systems are to a larger degree being constructed with built-in sensor system or with the possibility of retrofitting sensors to the pump system for the control and monitoring of the pump system. Pump systems are also increasingly being equipped with connectivity hardware, giving the sensor system and control devices connectivity to the internet or other servers. Furthermore, the pump system could also have alarm functionalities or problem solving modes which are in communication with each other and the control devices.

However, these sub-system typically do no operate using the same software and connectivity standards. Each of the sub-system may have different communication and input and output standards, which will create compatibility problems when cross analysing and controlling the entirety of the pump system if a retrofitting of the sub-system has occurred.

This results in difficulties in the implementation of new developments in sensor and pump sub-systems, as a local upgrade of the user's control system hardware and/or software is often required, before the new sensor can be used in the control of the pump or the control of a sub-system can occur. This, however, does not guaranteed compatibility.

As such, a user is often required to use multiple applications in order to access the system (sensor) data associated with the pump system and different approaches for controlling the pump system have to be utilized. This is a resource heavy undertaking by the user and a simpler solution is advantageous. Further, a system that can control and monitor the pump system from a standard third party communication means may be preferred.

Hence, an improved monitoring and control system would be advantageous, and in particular a user friendly system is preferred.

OBJECT OF THE INVENTION

It is a further object of the present invention to provide an alternative to the prior art.

SUMMARY OF THE INVENTION

Thus, the above described object and several other objects are intended to be obtained in a first aspect of the invention by providing a computer implemented system configured for controlling and monitoring a pump and/or pump system, the system preferably comprising
 a pump system comprising at least one pump, at least one sensor configured for providing an operating state data signal representative of a mechanical, fluidicly, electrical operating state and/or other system data of the pump system and at least one control module controlling the mechanical, fluidicly and/or operating state of the pump and/or the pump system in response to a received control signal;
 a digital twin module comprising a data processing API and an IoT database, said digital twin module being configured for retrieving said operating state data signal and storage of the data in the IoT database, and being configured to communicate with a chatbot agent,
 a chatbot agent configured for being in data communication with the API of the digital twin module, a user and the pump system, and configured to upon a request from a user:
  providing an actual or historical operating state of the pump by use of the API of the digital twin module extracting from said information from said IoT database, and
  transmitting a control signal, representative of a parameter, to the pump system to set the pump at a requested mechanical and/or electrical operating state.

By other system data is preferable meant any data which can affect the running of the pump system and may include the temperature of the pump system, the temperature of the room the pump system is located in, in the case of heat pumps the temperature of the room where the heating is supplied to, such as the comfort heating, GPS data, valve pressure, valve positions and the likes.

In an alternative implementation, the system is adapted to communicate with the pump system.

In preferred embodiments, the digital twin module may further comprise a machine learning application, said machine learning application may be trained on a numerical hydraulic/fluidly modelling of the pump system, or the pump in its particular use, to predict expected values of mechanical, fluidicly and/or electrical variable of the pump system or such variables of the pump in its particular use, where such variables may include predictions on expected values of such variables and classification of operating states of the pump or the system in which it may be used.

In preferred embodiments, the chatbot agent may further be configured for controlling the pump system autonomously based on algorithm(s) and/or machine learning application(s).

In preferred embodiments, the system may further comprises a data connectivity module which may be configured for:
receiving said operating state data signal from said at least one sensor and transmitting said signal to the digital twin module and the chatbot agent,
receiving said control signal from the chatbot agent and transmitting said signal to the control module of the pump system.

In preferred embodiments, the chatbot agent and digital twin module may further be configured for data communication with one or more of the following modules; a natural language understanding module which may be configured for converting the user input text or speech into a format which may be suitable for execution by the digital twin module, a CRM module, a knowledge base module or third party communication platforms, such as Skype, Messenger, Facebook, chat platform, SMS, MSS service or other communication and social media.

In preferred embodiments, the system may further comprise a knowledge base module comprising a database, the database may store generic data and specific data, wherein the generic data contains generic information about the pump model and generic operational states of the pump, the specific type data may contain information specifically pertaining to the pump, such as the location, age and usage of the pump, the knowledge base module may be configured for providing to the chatbot agent generic and/or specific data by extracting data from or storing data in the database of the knowledge base module upon receiving a request from the chatbot agent.

In preferred embodiments, the digital twin module may contain metadata, preferably stored in the IoT database, of that particular pump from which data may be received, such as spatial position, model, total operational time, and specific application of the pump.

In preferred embodiments, the sensor of the pump system may be selected from one or more of the following: a differential pressure sensor (pressure head), a temperature sensor, a vibration sensor, a flow sensor, such as a volume flow sensor, an RPM sensor, a power sensor, a sound sensor, a water level sensor, a pH sensor, an ultrasonic sensor, an efficiency sensor, a vibration sensor, a turbidity sensor, a viscosity sensor, valve sensors.

In preferred embodiments, the digital twin may send multiple control signals to multiple control modules in order to change the setting of the pump system.

In preferred embodiments, the chatbot agent may be adapted to receive as input a contextual 3-d scan of the room and/or a scan of the temperature and/or scans of the labels of the pump system for identifying different sub-components.

In a second aspect, the invention relates to a method of using a system according to the first aspect of the invention, the method preferably comprising the steps of
the digital twin module receiving or retrieving from the pump system an operating state data signal obtained such as sensed by the sensor and being representative of an operating condition of the pump and/or pump system,
the chatbot agent receiving a request from the user, the request being either
i) a request for an actual or historical operating state(s) or expected future running state of the pump, or
ii) a request for a specific mechanical, fluidicly and/or electrical operating state of the pump,
iii) a request for guidance, problem shooting and/or optimization, such as which flow setting the pump system should have
in case of i), the chatbot agent processes the request into an input to the digital twin module, and the digital twin module processes the input and provides to the chatbot agent the actual and/or historical operating state(s) by extracting data from the database;
in case of ii) the chatbot agent processes the request into input suitable for the control module;
in case of iii) in case of iii) the chatbot (1) uses the knowledge based system or other modules to answer the request, and, optionally, sends a request to the control module.

In an embodiment the chatbot may send the required input, in the correct format and to the correct control module, which will change the state of the pump system. This is advantageous as a central external system will carry out the control of the entire pump system, which may have different input and output specifications, and ensure optimal operation analysis of the pump system. The chatbot may also ensure that the control input is readable for the control module.

A digital twin may alleviate sensor data collection compatibility problems, as the digital output and input standard can be changes and update centrally to reflect the development in the field.

In preferred embodiments, the digital twin module may process the input, such as look up, extrapolation, interpolation, machine learning algorithm, visualisation.

In preferred embodiments, the output data from the digital twin module may be one or more of: raw data, processed data from said at least one sensor, such as a graph, a picture, a possible command to the control module, a video etc.

In preferred embodiments, the chatbot agent may further be configured for displaying a list of one or more possible actions based on the processed output and changes the settings of the pump system according to the user's choice of action.

In preferred embodiments, the chatbot agent may further communicate data with a knowledge base module, which may be configured for processing the output from the digital twin module based on empirically obtained knowledge of the pump system, such as laboratory test, prior application history of other pump systems, expect data based on the input from the chatbot, such as to produce a list of possible actions for the user for solving a possible operating error.

In preferred embodiments, the chatbot agent may further be configured for receiving and/or detecting inconsistencies from the pump system and may communicate the alarms to the user.

In preferred embodiments, if the system fails to produce a solution a connection to a Remote Support service may be facilitated via the chatbot.

In preferred embodiments, the digital twin module may receive the pump system data from a data connectivity application and the chatbot may send the instructions for changing the settings of the pump system to the data connectivity application.

In preferred embodiments, the machine learning algorithm may be trained using a learning loop, such as an autonomously training loop, human feedback loop, multi-level feedback training etc.

In preferred embodiments the user may, by use of a collection of imaging or a scanning device, scan the room and may use the data as input for the chatbot agent, either when prompted to by the chatbot agent or as a part of the set-up phase of the digital twin.

In a further aspect, the invention relates to a computer program product being adapted to enable a computer system comprising at least one computer, such as a mobile phone, tablet, having data storage means in connection therewith to control a system according to the first aspect of the invention, such as a computer program product comprising instructions which, when the program is executed by a computer, cause the computer to carry out the method of second aspect of the invention.

This aspect of the invention is particularly, but not exclusively, advantageous in that the present invention may be accomplished by a computer program product enabling a computer system to carry out the operations of the system of the first aspect of the invention when down- or uploaded into the computer system. Such a computer program product may be provided on any kind of computer readable medium, or through a network.

The individual aspects of the present invention may each be combined with any of the other aspects. These and other aspects of the invention will be apparent from the following description with reference to the described embodiments.

A digital twin, as used herein, is typically and preferably used to reference a digital representation of a physical pump and/or pump system. As disclosed herein, the digital twin may be implemented by a machine learning application, table based and/or programming of logic representing the pump or pump system (or combinations thereof), IoT data, manufactory data, service data, prior knowledge relating to the pump system and factors relating to the pump system.

The digital twin may then be seen as a dynamical model representing the pump system. Further the digital twin may have a module for predicting the current state of the pump, as well as future states of the pump system based on the operating state history. The digital twin may use an AI-engine to determine the future running state of the pump, based on input from the chatbot, or requests from the chatbot.

An "IoT database", as used herein, may be a database including various data base systems that store sensor data and/or other data. An IoT database may include time series databases and/or historical data.

"IoT" is used in a manner being ordinary to a skilled person. Typically, IoT typically comprises a number of devices each having unique identifier and that can be communicated with over the internet or similar communication channel.

A "sensor", as used herein is preferably to be interpreted broadly as a sensor element, an actuator or similar. Further, sensed, such as measured, values may be directly sensed values or derived values. A sensed value may be provided by an electrical signal and may pass through an e.g. analogue-to-digital converter for being processed by the various modules, agents and platforms of the invention. For instance values on flow (m/s; m$^3$/s) is often derived based on other variables e.g. pressure. An actuator may be an actuator being activated by the pump system (or other elements) and providing a readout correspondingly and/or an actuator receiving e.g. settings from the system disclosed herein and/or by other sources.

A "knowledge database", as used herein is preferable to be interpreted broadly as a database storing complex structured and unstructured data pertaining to the pump-system and situations the pump is operating in. An entry in a knowledge database may be chosen from the following; type of pump, link to other entries action of the user, reactions of the pump during use, etc. These point may be found using historical data, expert input and user input. The entries may be represented as nodes in a graph structure, with classes, subclasses and instances, which can be retrieved by the Chatbot.

A pump system is preferable meant a system comprising at least one pump and at least one or more sub-systems connected to the pump, such as a HVAC system.

Herein "connection" is typically used to reference a connection between modules agents and platforms. Such connections are in many instances data connection for communicating data and such connection may be established as wireless and/or wired connections.

By connectivity module is preferable meant software adapted to facilitate the transfer of data and translation of input/output syntax of data between modules. The connectivity module could in certain embodiments be physical hardware, preferably with embedded software, connected to the pump system or forming part of the pump system.

"Contextual scan" is preferably used to reference a method of obtaining information, in digital format, pertaining physical entities and their contextual interrelation. The contextual interrelation may comprise one or more of dimension, physical positioning absolutely and/or relative to other devices or physical entities, data on function and/or operation, and/or other parameters that are useful for providing a contextual description.

It is noted that the various modules and systems adapted to share information disclosed herein typically and preferably contains an API.

Further aspects and embodiments are presented in the following detailed description as well as in the dependent claims.

BRIEF DESCRIPTION OF THE FIGURES

The system and method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Arrows depicted in the following figures represents the flow of information between the systems.

Figure 1:
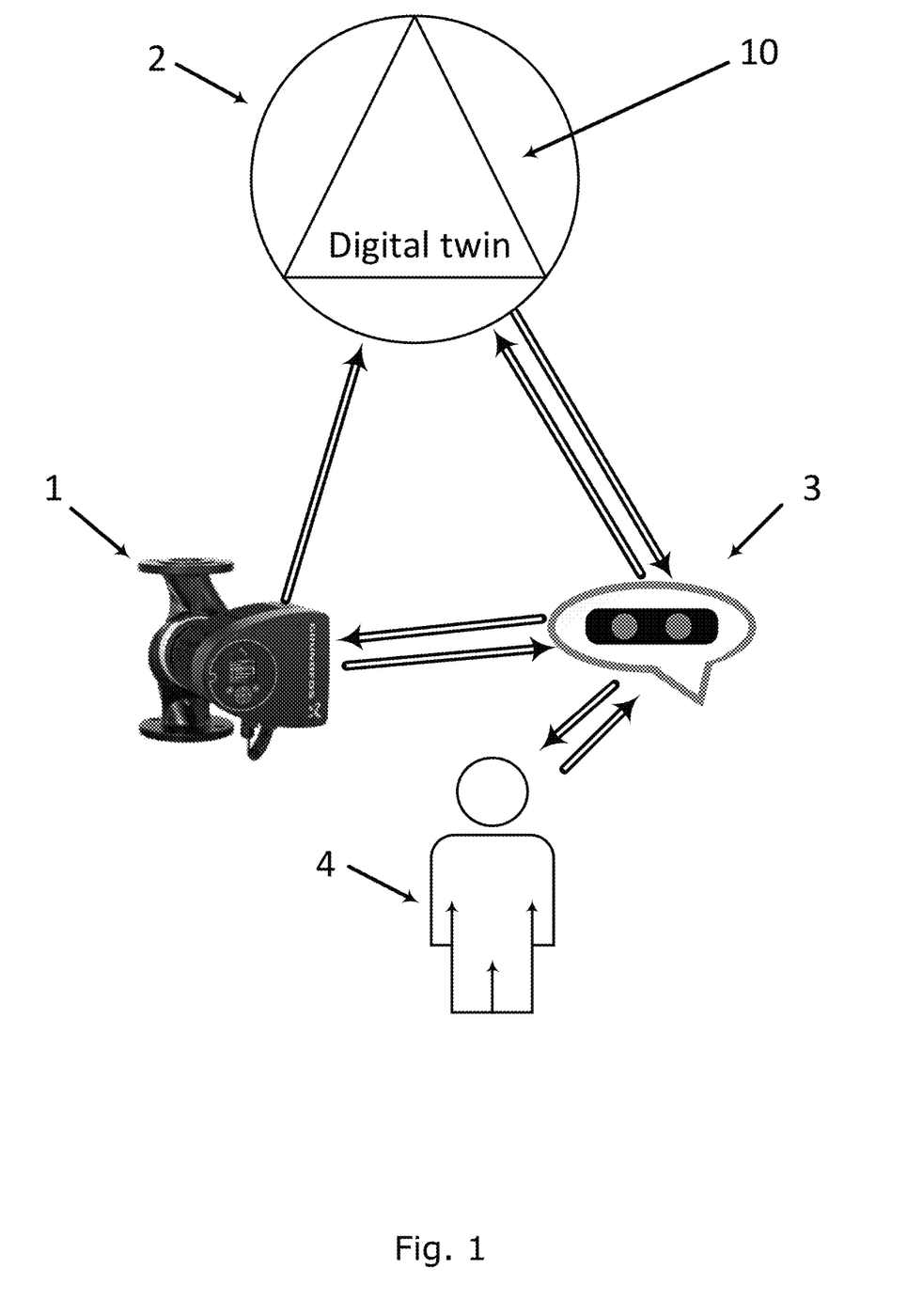
FIG. 1 is a schematic illustration of a system according to an embodiment of the present invention.

Reference is made to FIG. 1, illustrating a system according to an embodiment of the present invention.

The system according to a preferred embodiment illustrated in FIG. 1 comprises a pump system 1 represented with a pump in FIG. 1, a digital twin module 2 and a chatbot agent 3. As indicated the system communicates with a user 4 of the system. The pump system further comprises a least one pump 20, a sensor 21 for providing the operating state data signal representative of the pump mechanical and/or electrical operating state, and a control module for controlling the mechanical and operating state of the pump in response to a received control signal.

The digital twin module 2 comprises a data processing API and an IoT database 10. The digital twin module 2 is configured for the retrieval of said operating state data signal from the pump system 1 and storing of the data in the IoT database 10. The digital twin module 2 is in data communication with the chatbot agent 3, wherein the chatbot agent 3 is configured for being in data communication with the API 11 of the digital twin module.

The chatbot agent 3 is further in communication with the user 4 and the pump system 1, and configured to upon receiving a request from the user, to provide an actual or historical operating state of the pump 20, by use of the API of the digital twin module 2, extracting said information from said database, or transmitting a control signal to the pump system 1 to set the pump 20 at a requested mechanical, fluidicly and/or electrical operating state.

The chatbot agent 3 will guide the user to find the correct control parameter to change and send the associated control signal to the pump system 3 for a change in the operating state. The chatbot can provide guidance, be reactive and proactive in the control and operation of the pump system 1. This includes prompting the user with questions and using the answers to collection data about the situation, such as contextual 3d scans, error message of the pumps etc.

Figure 7:
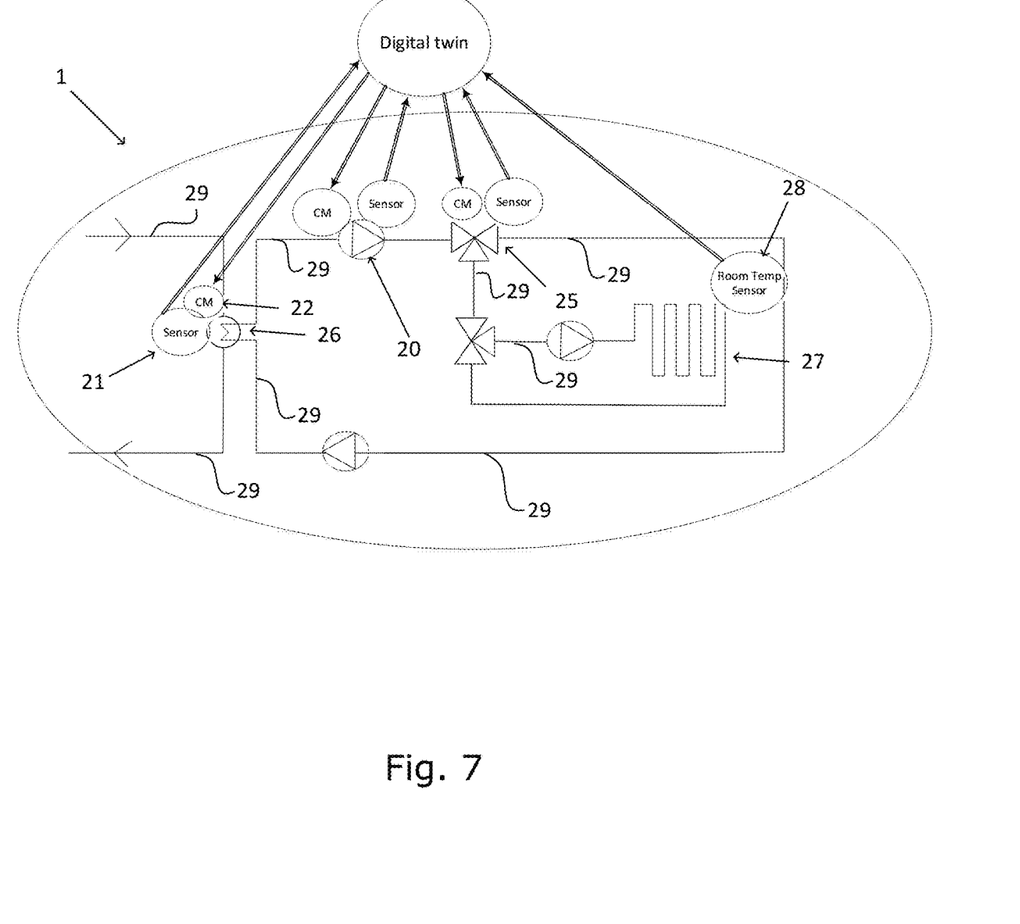
FIG. 7 shows an example of the implementation of the invention.

The contextual scanning may comprise getting, e.g. by prompting, the user to scan the room in which the pump system is located within and/or other relevant spaces, such as spaces that is connected to the pump system, for example rooms containing radiators that is being supplied by the pump system, such as the pipes 29 in FIG. 7. The scans can be used as underlining data for the set-up and modelling of the digital twin module 2 or as additional data input in the guidance provided by the chatbot agent 3 or as input for the knowledge-based module 15. Such scans could include scanning the individual components or subsystems of the pump system, such as the associated product labels. It could also encompass scanning the room the pump system is located within and using the associated contextual data in the digital twin or input for the knowledge network. This data could be 3 dimensional data interfered from 2-d static, dynamic imaging, 3d scan or the likes. It could also be generated from photos.

The scans could advantageously be carried out using a scanning device, such as a mobile phone, optionally using an in-built functionality of the chatbot agent or an external camera or other suitable device. The scans can also be combined or information added to create annotated scans, by scanning the room and adding information about the individual components, such as age, usage amount, location, and connection points etc. This could be completed by scanning the individual components and/or adding information manually, optionally by selecting an area on the scan and adding specific information to that area. The information and annotation could be media, 360 degree images, voice, text, thermal, sound recording, vibrations, sensor data, video, URL, GPS coordinates, flow directions etc. The annotation may be AI generated annotation.

The information provided by the scans could be the configuration, the structure or the placement of the pump system 1 typically including piping of the system, such as the placement and configuration of the pipes, the dimensions of the room, physical defects of the pump system or subsystems or other relevant, visible or hidden factors. Additional information and devices could also be used to generate scans and scan information, such as external temperature gauges, humidity meters or other measuring devices not part of the pump system.

Scans could therefore be understood as the gathering of information about the system, which could be scanning using a camera on a mobile phone and reconstructing the room using contextual 3-d processing or by using different measuring devices to scan the surroundings for other parameters, such as temperature, humidity etc. The temperature of the different components, sections and subsystem of the pump system could also be scanned using an infra-red camera.

The processing of the scans could be done in a separate extraction module, which could deploy machine learning techniques, imaging techniques or other processing techniques in order to process and extract information from the scans, such as Spatial Data, Persistence, Contextually integrate IoT Data, creating and restoring persistent, accurate digital anchors.

In the present embodiment a user 4 can make a request to the chatbot 3, such a request could be to obtain the operating data from the last 7 days of the pump 20. The chatbot 3 processes the request from the user and forwards the request to the digital twin module 2. The digital twin module 2 processes the request from the chatbot agent 4, analysing the pump 20 IoT database 10 by use of the API 11 of the digital twin module 2 and forwards the processed data to the chatbot agent 3. The chatbot agent 3 presents the received data from to the user 5, which may include post-processing of the data from the digital twin to represent the data as a graph etc. to the specification of the user.

In one embodiment of the invention the digital twin module 2 is able to predict based on the data in the IoT database 10 or other sensor data the future running of the pump 20, the prediction is typically conducted using algorithms and/or machine learning algorithms or AI in the digital twin.

The machine learned algorithm is trained using a learning loop, such as an autonomously training loop, human feedback loop, multi-level feedback training etc.

In the present invention the digital twin and the chatbot may comprise separate machine learning/AI application, wherein the digital uses the machine learning to predict the future running of the pump system or what changes should be implemented to fulfill a request, such as changing of the temperature in a room. The chatbot could also comprise a machine learning/AI for use in the diagnosis and gathering of the relevant information and guidance of the user.

Such an application may be termed a model predictive control application of the chatbot. The chatbot will based on the available option help the user in deciding the best change of the control parameters and received appropriate information from the digital twin. This could testing possible changes to the operational parameters before physically implementation. Here the chatbot may ask the digital twin the outcome of the proposed change of perimeters and adjust the settings accordingly.

The user 4 can also request that the operating state of the pump 20 is changed, such as changing the position of a valve from open to close. In such a case the chatbot 3 sends a control signal to the correct control module of pump system 1, which changes the settings of the pump system 1 according to the user's 4 request.

In many preferred embodiments, the digital twin module 2 model predictive control application comprising a machine learning application. The machine learning or model predictive control application is trained on a numerical hydraulic/fluidly modelling of the pump system (1), or the pump (20) in its particular use. Such a hydraulic/fluidly modelling may vary from a tailored formulation of the Navier-Stokes equations suitable discretized (e.g. finite difference or finite element) to a model where modelling resembles empirical relations between parameters of the system considered. Depending on the nature of the system, the modelling may or may not include components beside the pump 20 itself such as pipes, valves, or other mechanical and/or electrical components of the system.

Further, the modelling may typically also comprise a modelling (of not included otherwise) of the dynamics of the sub-system. This may also include statistical analysis and use of the knowledge database in the machine learning algorithm of the digital twin.

The machine learning application is trained from historic data to predict expected values of mechanical, fluidicly and/or electrical variables of the pump system 1 or such variables of the pump 20 in its particular use, where such variables includes predictions on expected values of such variables. It could also comprises data from the knowledge database and other modules connected to the system, such as to predict use patterns. The prediction of use patterns could also be done in the digital twin or in the chatbot. The training of the digital twin could be done by comparing the predicted future state of the pump after a request from the chatbot, and, if the change is implemented, comparing this to the actual future state after the change has occurred.

Another function of application could also be a classification of operating states of the pump or the system in which it is used, this classification algorithm could be of several types: Data driven machine learning classification algorithms, symbolic reasoning with IoT data or signal processing based (or a mixture of these AI paradigms).

Thereby, the digital twin module 2 may be viewed as a digital representation of the pump system 1, which may used in the present invention as a consulting module to mimic the operation of the pump system 1, e.g. allowing a user through the chatbot agent 3 to e.g. virtually operating the pump system 1, without actually having to change the setting of the pump system 1, and obtain a prediction on such changes, which in turns allows the user to operate the pumps system in a more optimal fashion with limited risk of failure. Further, the digital twin can be used to diagnose for a cause of a certain occurring malfunction.

Although the digital twin 2 is disclosed as comprising a machine learning application, the digital twin 2 can be implemented without such a machine learning application. In such application, the functionality of the digital twin may be table based and/or programming of logic statements.

Figure 2:
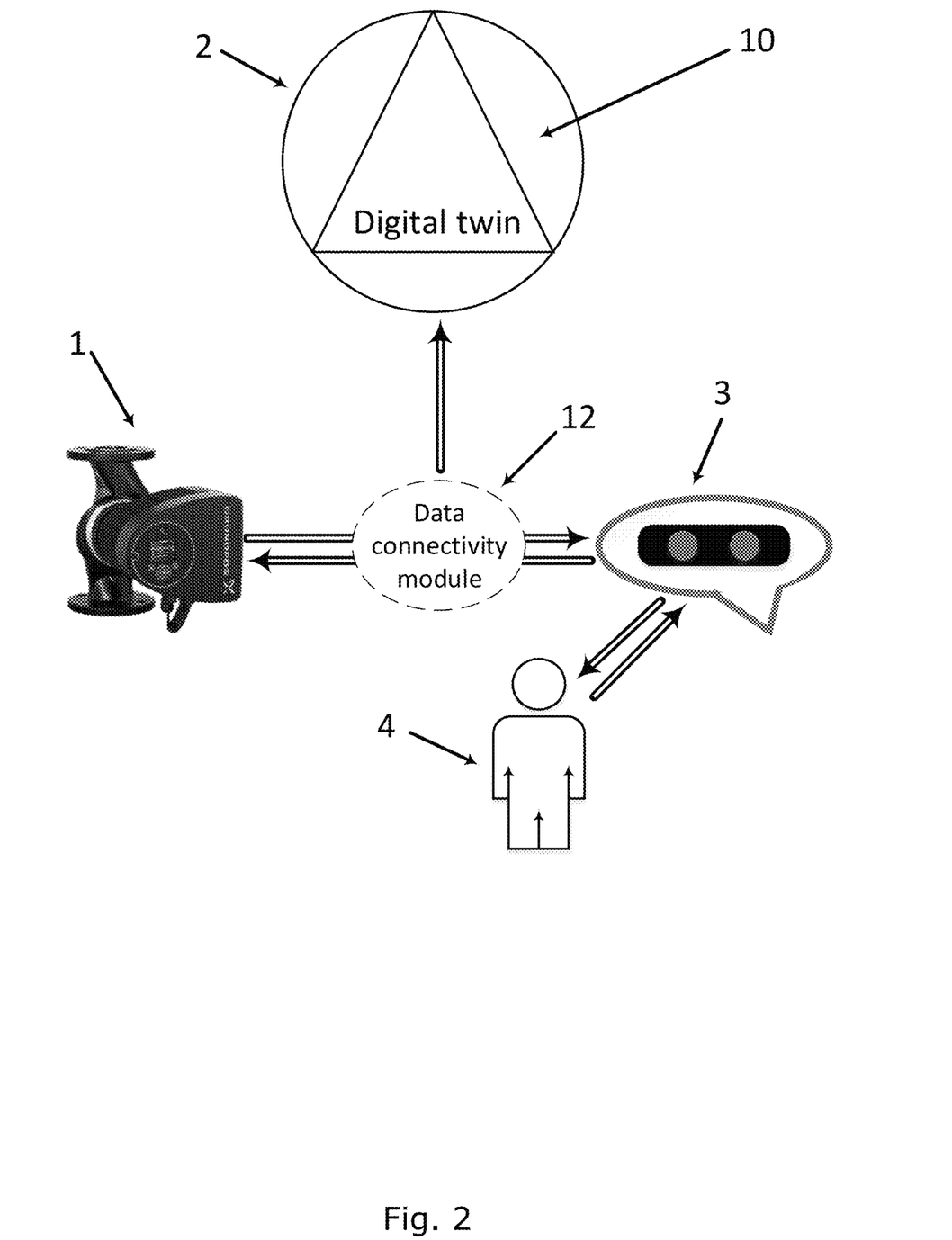
FIG. 2 is a schematic illustration of a data connectivity module in an embodiment of the present invention, FIG. 3 schematically illustrates an embodiment where the pump system sends a message about a pump inconsistency to the user, FIG. 4 schematically illustrates an embodiment including a data connectivity module connected to the chatbot, FIG. 5 schematically illustrates an embodiment of the knowledge base module, FIG. 6 schematically illustrates a preferred embodiment of an implementation of a system according to the present invention

As illustrated in FIG. 2, another embodiment of the invention comprises a data connectivity module 12. As will be detailed below, the embodiment of FIG. 2 may be combined with the one shown in FIG. 1. The data connectivity module 12 is configured for receiving said operating state data signal from one or more sensors 21 of the pump system 1, and transmitting said signal to the digital twin module 2 and/or the chatbot agent 3. The data connectivity module 12 is further configured for receiving said control signal from the chatbot agent 3 and transmit said signal to the control module 22 of the pump system 1, thereby implementing the control signal in the pump 20. The input to the data connectivity module 12 may inter alia come from the digital twin, from the chatbot agent 3, from another module or may even come from an external device.

It is noted, that the data connectivity module 12 may be implemented in the pump system 1, or it may be implemented as a module being separate from the pump system 1. Further, the data connectivity module 12 may be implemented in the digital twin, so that all communication requiring the presence of the data connectivity module 12 goes through the digital twin.

The operation state data is typically provided or retrieved by the chatbot agent 3, which sends a request signal to the data connectivity module 12 requesting a data signal transferring the data. Upon such as request received by the data connectivity module 12, this module retrieves the data from the sensor(s) 21 and forwards the data as a signal to the chatbot agent 3. This could also be a sub-system in the pump itself.

This allows the chatbot agent 3 and digital twin module 2 to connect with an array of different pump sub-systems, without needing a native connectivity module in the pump sub-system, such as with retrofitted sensor system and pumps. The data connectivity module 12 can be retrofitted to an existing pump system and connected to the chatbot agent 3 and the digital twin module 2.

Figure 3:
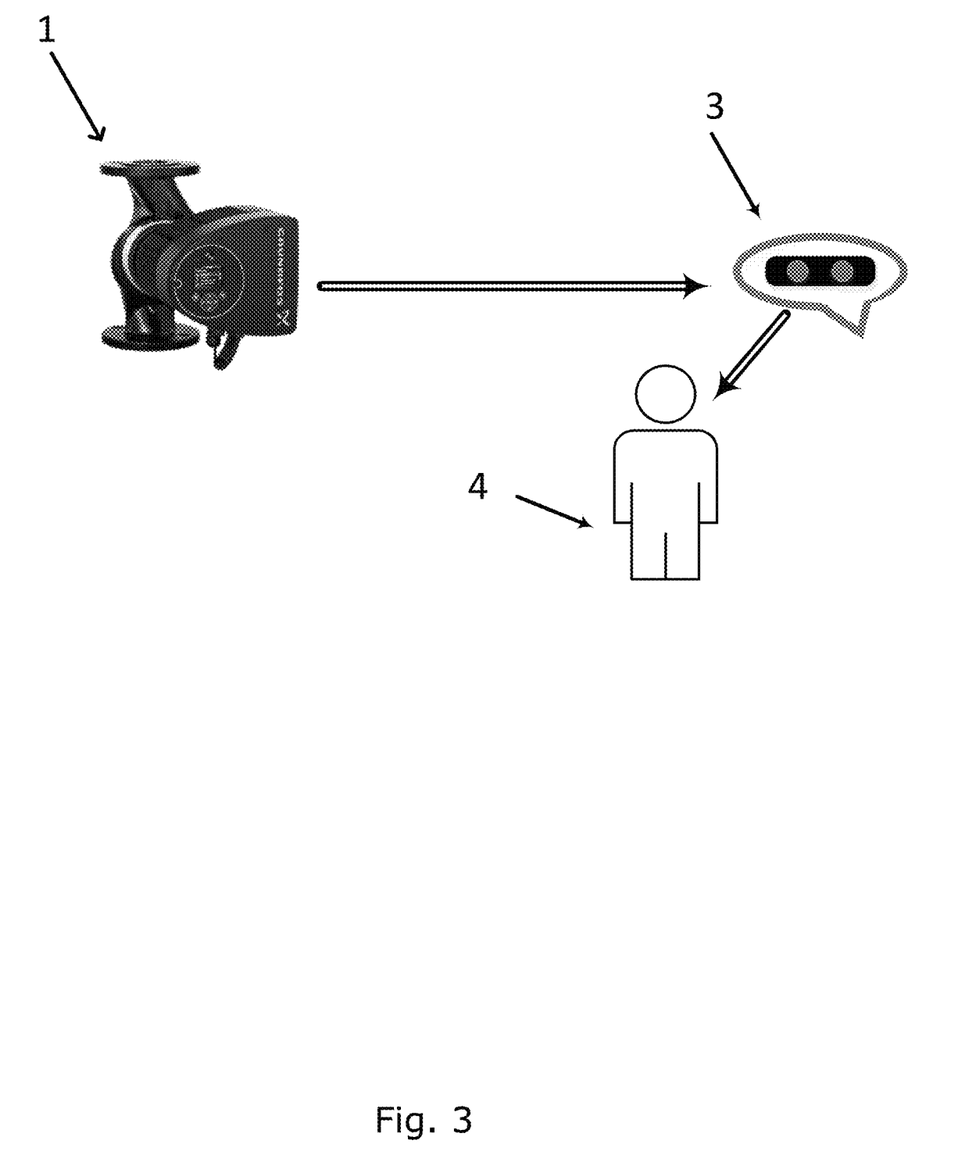

Turning to FIG. 3, in another embodiment, the pump system 1 and the data connectivity module 12 is adapted to detect inconsistencies in the pump system and notify the chatbot 3, which alerts the user. Such inconsistencies could be abnormal running condition, alarms detected by the pump 20 operating system, sensor values over a threshold predefined from the factory etc. This could also be detected by use of the digital twin, but is communication to the user via the chatbot.

Figure 4:
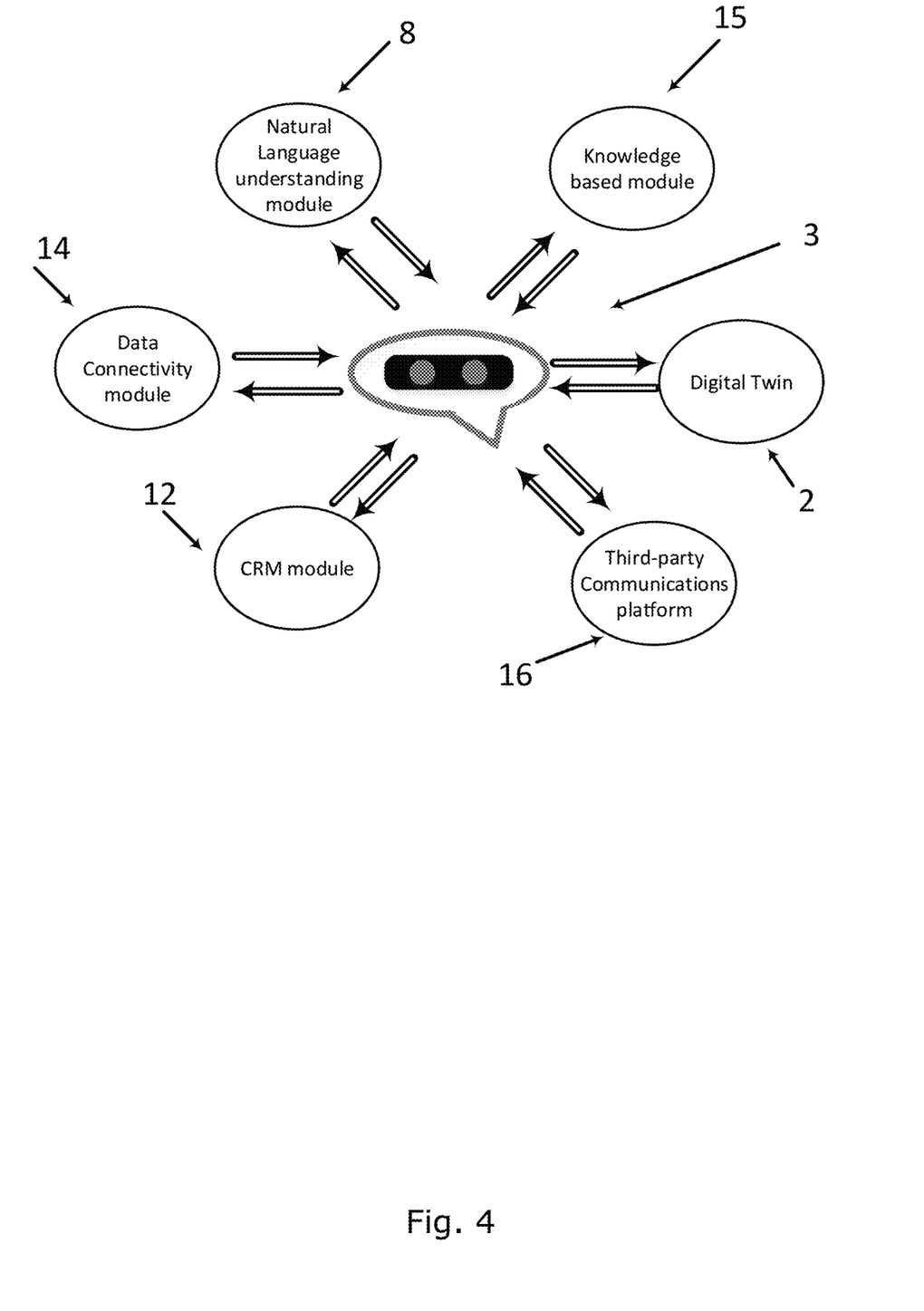

Now turning to FIG. 4, in another embodiment of the invention the chatbot agent 3 is further configured for data communicating with one or more of the following modules; a natural language understanding module 13 configured for converting the user input text or speech into a format suitable for the digital twin module, a CRM module, a knowledge base module 15 and third party communication platforms, such as Skype, Messenger, Facebook or other social media.

In the embodiment shown in FIG. 4, the chatbot agent 3 is adapted to receive, from a third party communication platform 16, an instruction in the form of a message. This could be a skype, text message or audio file. The chatbot agent 3 converts the instruction by use of the natural language understanding module 13 into computer executable commands. The chatbot agent 3 is further adapted to send the commands to the relevant sub-system, such as the digital twin module 2, if the command relates to acquiring information, analysing or problem-shooting If the command relates to obtaining the current operating state of the pump 20, the chatbot agent 3, which is adapted to communicate with the data connectivity module 12, forwards a request to the data connectivity module 12. The data connectivity module 12 obtains the requested operation state from the pump system and forward this to the chatbot agent 3.

If the command relates to changing the operating state of the pump, the chatbot agent 3 sends the command directly to the data connectivity module 12, which in turn sends the command to a control module 22 of the pump 20 thereby changing the settings of the pump 20. Such an electronic pump controller is typically configured for changing pump settings, such as mechanical and/or operational state of the pump, such as RMP of an impeller in response to a received control signal.

In one embodiment the digital twin module 2 contains metadata on the particular pump 20 for which data is received. Such metadata may include spatial position (e.g. basement north-west corner), model (e.g. manufacturer pump id), total operating time and specific application of the pump 20. The meta-data is typically stored in the IoT database 10 of the digital twin 2.

Further the chatbot agent 3 is adapted to facilitate the transfer of data between the modules, such as between knowledge base module 15, the natural language understanding module 13, third party communication platforms (e.g. Skype, Messenger, Facebook or other social media), CRM module 14, the data connectivity module 12 and the Digital twin module 2. For example, the knowledge base module 15 may require meta-data contained, such as stored in the IoT database 10, in the digital twin module 2 or the CRM module 14, such as the pump 20 model, sensor 21 types etc. The metadata can be utilized in the knowledge base module 15 as input and the chatbot agent 3 is adapted to facilitate the transfer of data between the digital twin module 2 and the knowledge base module 15. This information could also be the operating history obtained and stored in the digital twin module 2, e.g. for use in the knowledge base module 15.

The transfer could also occur directly between the modules, as they could implemented using the same system architecture.

Figure 5:
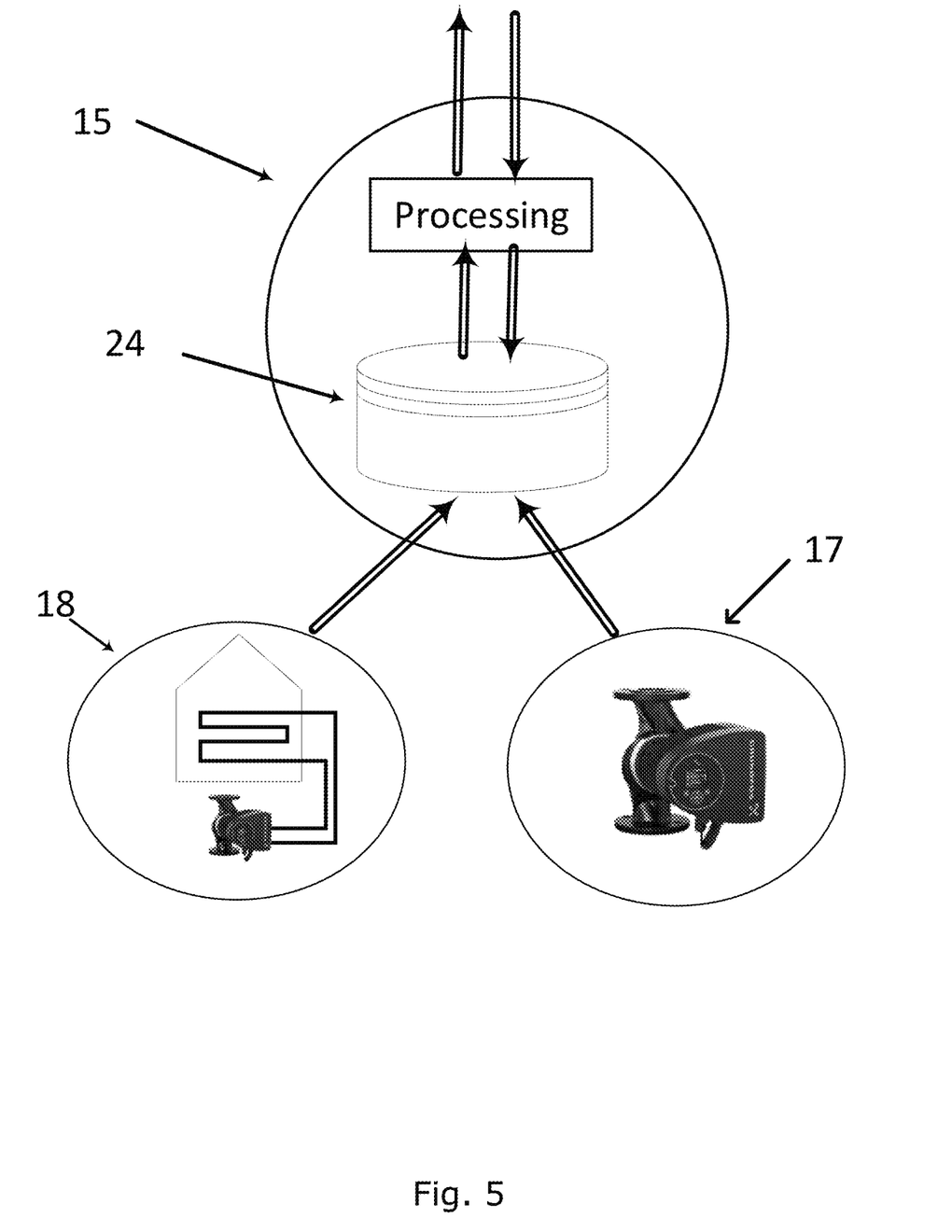

The knowledge base module 15 comprises in an embodiment, as depicted in FIG. 5, a database 24. The database 24 storing generic 17 and specific data 18 pertaining to a number of different pumps. The generic data 17 contains generic information relating a specific pump model and operational states of the pump 20. The specific data containing information pertaining to a specific pump 20, such as a location, age and usage of the pump 20. The knowledge base module 15 is configured for providing to the chatbot agent 3 generic and/or specific data by extracting data from or storing data in the database of the knowledge base module 15 upon receiving a request from the chatbot agent 3. In case of storing data, the data is received from the chatbot agent 3.

The following table is a non-limiting example on data stored in database 24 of the knowledge base module:

| | Generic data | | | |
|---|---|---|---|---|
| | RPM [1/min] | Pump Head (PH)[Atm] | Volume flow (V)[m3/h] | Electrical power consumption (EPS) [kWh] |
| Pump manufacturer ID = 1 | 10 < RPM < 200 | 1.1 < PH < 2.0 | 10.0 < V < 30.0 | 1.0 < EPS < 5.0 |
| Pump manufacturer ID = 2 | 20 < RPM < 100 | 1.1 < PH < 2.0 | 15.0 < V < 30.0 | 1.5 < EPS < 5.0 |

| | Specific data - Pump manufacturer ID = 1 | | | |
|---|---|---|---|---|
| Specific application | RPM [1/min] | Pump Head (PH)[Atm] | Volume flow (V)[m3/h] | Electrical power consumption (EPS) [kWh] |
| Central heating recirculation | 10 < RPM < 20 | 1.1 < PH < 1.5 | 10 < V < 15 | 1.0 < EPS < 2 |
| Garden pond | 10 < RPM < 100 | 1.1 < PH < 2.0 | 10.0 < V < 20.0 | 1.0 < EPS < 5.0 |

| | Problem - shooting table | | | |
|---|---|---|---|---|
| Pump type | Characteristic of the problem | Common problem | Common solution | Link |
| Low water pressure | 20% of optimal optional pressure | Clogging in the pipe network | De-clogging | How to de-clog the pump system |
| Not sufficient heating of the room | Desired room-temperature cannot be retained | Heat pump malfunction | Replacement of heating element | How to change the heating element |

Thus, the data stored in the knowledge base database 24 could be one or more types. The first type of data could be of generic data 17. The generic data 17 could be obtained by empirical knowledge from employees, experts, users and historical data of the pump model. The historical data of the pump model could be based on laboratory or field testing of the pump model, where effects of e.g. wear and tear are examined to produce general correlations between variables. The generic data 17 does not take into account the location and specific usage of the pump.

The generic data 17 can further be divided into situation based data and pump based data. The situation based data could be data regarding the operating difficulties, procedures or solutions based on a specific situation, such as a valve overheating. The other kind of generic data pertains to the specific pump 20 model. This kind of data could be that the pump experiences a power-reduction at certain operating conditions.

The second kind of data stored in the above embodiment are specific data 18. The specific data 18 takes into account e.g. one or more of age, location and specific usage of the pump, which could include data about the running of a specific pump for a specific situation, e.g. the running of a pump 20 for underfloor heating, wherein the pump is situated in the basement, is two years old etc. The knowledge output of such a situation could be that the operating point of the pump is shifted. The specific type data can be obtained by empirical knowledge from employees, experts, users and historical data from the pump obtained from the users.

The empirical knowledge can also be obtained by processing the data obtained from users and laboratory testing, with or without the use of expert knowledge. The knowledge base module 15 receives data and input instructions from the chatbot agent 13 and/or the digital twin module 2 and/or one of the other modules disclosed herein.

The knowledge base module 15 may serve inter alia, the purpose of providing the system with the data pertaining to a specific pump installation wherein the generic data may be viewed as providing a generic operating state space for a specific pump and the specific data may be viewed as providing a specific operating state space for a specific installation of a specific pump 20.

The knowledge base data can be represented as nodes in a graph structure, wherein the node is specified by both generic and specific information, with branch node going out from a central node. The generic data could be a central node and the specific information could be branch nodes. Nodes and branch nodes can also be problems and solution, linking operational conditions with problems, which can be further be linked to a solution. Nodes and branches node can contain multiple nodes and branches. This graph structure can be viewed as relations data. This is also called a knowledge graph, wherein the representation represents a collection of interlinked descriptions of the classification of the data. This is also though to include ontological connection, such as with rules.

Connection with other nodes are possible, linking solution, problems and making general connections between different central nodes and different branch nodes.

When using the pump system 1, the chatbot agent 3 may (if not known a priori) request a pump manufacturer ID by the data connectivity module 12 requests this information from control module 22 of the pump (this information is typically pre-coded into the control module 22). Based on this information, the chatbot agent 3 can by communicating with the knowledge base module 15 obtain a generic operating state space for the pump 20. However, this information is typically not sufficient to allow a control or detection of mal-function of the pump 20, since this, often, depends on the specific application of the pump; this information can be obtained by the knowledge base module 15 as specific operating state space.

Upon, e.g., altering the setting of the pump 20, the chatbot agent 3 communicates with the user (as disclosed herein) and if, for instances the user request the pump to be operating outside the limits of the specific operating state space, but inside the limits of the generic operating state space, the chatbot agent 3 is configured to communicate, before altering the settings of the pump, that the new setting is outside the normal (or recommended setting) for the particular application but that the pump can be set to the new settings. If the user accepts this, the chatbot agent 3 alters the setting of the pump (as otherwise disclosed herein). Depending on the actual implementation, the knowledge base module 15 and/or the digital twin 2 may or may not be used to or assist in determine or predict a suitable operating state by use of programmed logic and/or machine learning application.

Similarly, the chatbot agent 3 may in some embodiments be configured to autonomously detect malfunctions of the pump by autonomously requesting an operating state signal via the data connectivity module 12 and comparing the state signal with the specific operating state space. If the state signal is outside the specific operating state space, an alarm is initiated by the chatbot agent 3 contacting the user with information on the cause of the alarm together with possible measures to alleviate the malfunction.

An alarm may also be initiated directly from the control module 22 of the pump 20, by the control module having a build-in capability to detect certain types of malfunction, e.g. non-rotation of impeller, overheating or the likes. In such situations, the control module 22 generates and forward an alarm signal to the data connectivity module 12 which forwards the signal to the chatbot agent 3. Upon receipt by the chatbot agent 3 of the alarm signal, the chatbot agent 3 may or may not consult the knowledge base module 15 e.g. to find a setting alleviating the malfunction and communicated with user.

The content of the knowledge base module 15 may also contain most or even all "master" information the manufacturer has about the pump systems and in particular the pumps, such as pump type hierarchies, applications, information on installations, service routine/procedures, customer data etc.

The operation performed by the chatbot agent 3 is advantageously carried out by implementing the chatbot agent 3 as an AI engine, wherein the training includes training an AI engine based using the generic (17) and specific (18) data as training material, with or without training.

The result of the operating performed by the chatbot agent 3 may include: a recommendation as to setting of the pump 20, a list of possible action, a warning, and notification to: order new part, schedule servicing, and to change the pump settings.

As disclosed herein, the pump system 1 may comprise one or more sensors to provide an operating state data signal representative of a mechanical, fluidicly and/or electrical operating state of the pump. Non-limiting examples on such sensors includes: a differential pressure sensor (pressure head), a temperature sensor, a vibration sensor, a flow sensor, such as a volume flow sensor, an RPM sensor, a power sensor, a sound sensor, a water level sensor, a pH sensor, an ultrasonic sensor, a efficiency sensor.

Figure 6:
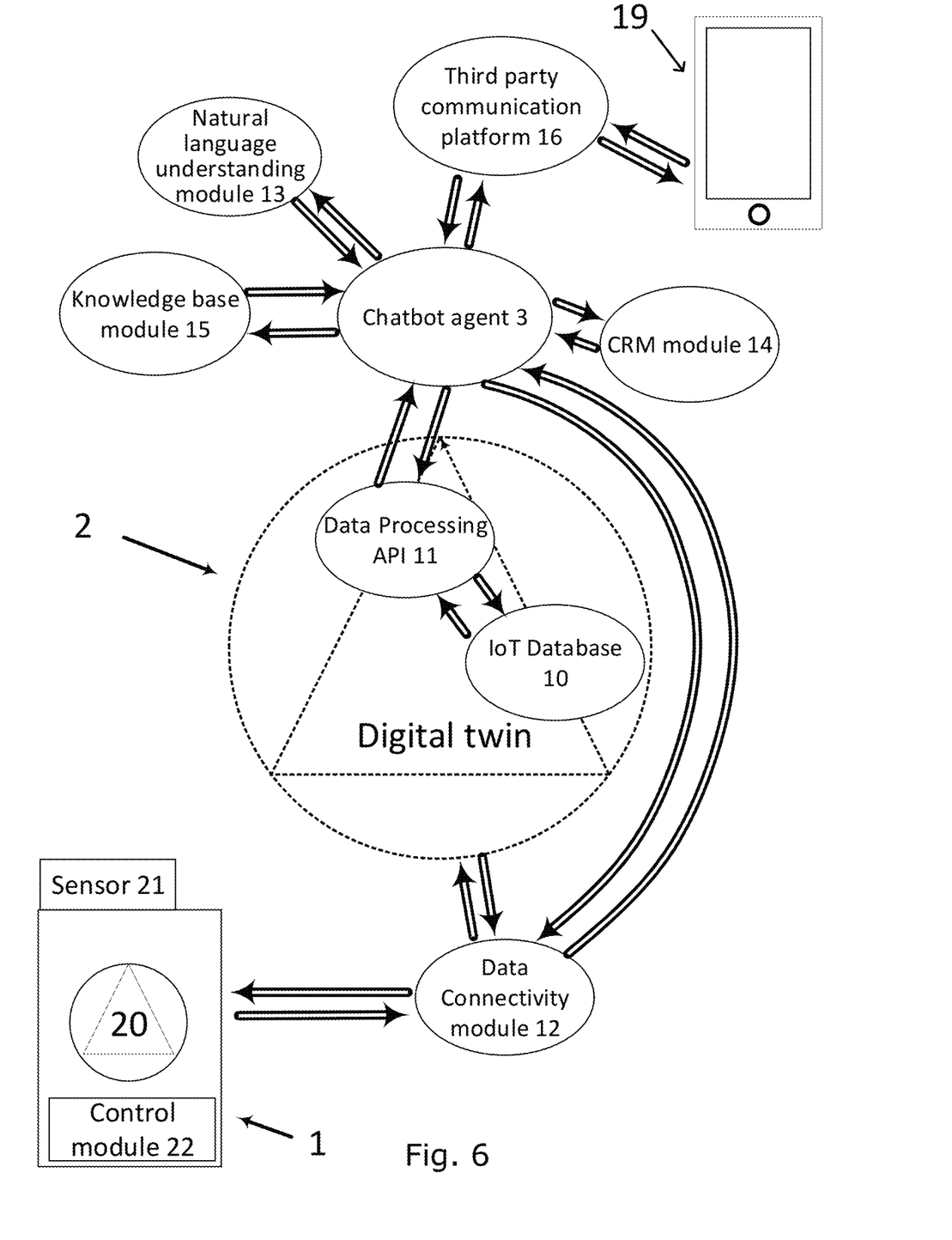

As shown in FIG. 6, in an embodiment of the invention, the user enters a command on a communication device 19 connected to a third-party communication platform 16. The third-party application is adapted to communicate with the chatbot agent 3. The chatbot agent 3 sends the received input to a natural language understanding module 13, which processes the input into computer executable commands. Based on the input, the chatbot agent 3 either sends the computer executable commands to the data connectivity module 12, which changes the setting of the pump 20, to the CRM module 14, which could be to establish contact with a representative of the pump manufacture, to the API of the digital twin module, which is connected with a IoT database 10, which sends back historical or present operating information of the pump 20 or replies to the user if the command is not understood.

Before the chatbot agent 3 sends the user input to the other modules, an authorisation step may be performed. Such a step may include the chatbot agent 3 requesting from the user a username and password for the pump system 1. Such a validation step means that a user 4 can communicate to the chatbot from any communication means 19 available and is not restricted to a specific one.

The data connectivity module sends operating data to the IoT database 10 of the digital twin module 2, which is in communication with the API of the digital twin module 2. When the chatbot agent 3 request data from the digital twin module 2, the API processes the data stored in the IoT database and sends the processed data to the chatbot agent 3.

If the input from the user concerns diagnostic or problem-shooting of the pump system 1, the chatbot agent 3 forwards the input instructions to the knowledge base module. The knowledge base module 15 may request additional data from the digital twin module 2 via the chatbot agent 3. The knowledge base module outputs to the chatbot agent 3 a list of possible actions and the result of the analysis.

The chatbot agent 3 forwards the information to the user via the third party communication platform. If the knowledge base module 15 is unable to produce a solution to the problem, the chatbot agent 3 will connect the user via a look-up in CRM module 14 to a representative from the pump manufacturer alternatively through a Remote support Service 23.

If the knowledge base module 15 finds a solution to the problem, the chatbot agent 3 may send the information to the user, which can confirm the action to be taken from a list of possible actions. The chatbot agent 3 sends the selected control command to the pump system 1 via the data connectivity module 12 or if the user chooses to do more diagnostic to the relevant subsystem.

In another embodiment, the input to the knowledge base module 15 comes from the chatbot agent 3, which has acquired this information from the digital twin module 3.

In the preferred embodiments disclosed in connection with the accompanying drawings, the information exchange between the various modules is shown as going through the chatbot agent 3. However, it considered within the scope of the present invention to provide data exchange directly between the various modules, such as the digital twin 2 being configured for data exchange with knowledge base module 15 or the CRM repository module 14.

In a preferred embodiment, operating data, or other data, for the pump 20 or pump system 1 is stored in the digital twin 3 and these or such data may be collected in the knowledge base 15.

Calculations and/or predictions of e.g. pump system setting, e.g. based on a user request, to e.g. meet a requirement, are typically carried out by algorithm(s) which preferably are in the digital twin 2 and/or in the knowledge base module 15. The digital twin 2 is adapted to obtain and/or upload an algorithm, such as an updated algorithm, from the knowledge base module. This is beneficial e.g. in case the knowledge module 15 comprises a "newer" and perhaps more suited algorithm which may be able to predict future operating conditions which the present algorithm of the digital twin 2 is not able to predict and vice versa. Further, in case of the digital utilises a machine learning application, such implementation may provide a consolidation of training material.

Thus, although FIG. 6 does not illustrate a direct communication between the digital twin 2 and the knowledge base module 15, such communication is within the scope of the invention.

Further, all the individual modules may comprise AI in some form or other. Where the digital twin AI is preferably directed towards operational prediction of the pump system and associate sub-system. The chatbot for directing the user to the right solution using the other sub-system and translating the information from the user as input for the other modules. The knowledge-base module for finding the correct solution. These AI could be implemented as separate components associate to the different modules or centrally in the chatbot, wherein the modules then act as databases.

Further, the chatbot or digital twin is configured for finding the correct control input for the pump system control modules.

Further, thus although FIG. 6 illustrates that information is routed through the chatbot agent 3, the various module may communicated directly with each other.

In FIG. 7, the present invention is implemented in a house heating embodiment. In such embodiments hot water from the municipality is provided to a heat exchanges, which is part of the pump system. A heating loop is provided within the house to provide heating.

In such a pump system multiple sensors and closed circuits exist. The heat exchanger 26 will contain sensors, measuring among other things the flow, the exchanged heat, the inlet and outlet temperature of the liquids etc. The heat exchangers will also contain a control module 22, which is used to control the setting.

After transfer of the heat to the liquid in the heating loop, a pump 20 will circulate the liquid in the loop. If the heating loop is large, two or more pumps may be present in order to circulate the water. Each of the pumps will have a control module and sensors monitoring the operational state.

The water will be pumped into rooms using controllable valves. These valves will also contain control modules and sensors. Each room will normally be configured as closed loops, replacing cold water with hot water when needed and heating the room using radiators. This is done using controllable valves and a room temperature sensor 28.

All of these sensor and components need to work together in order for a room or house to be heated. If a problem occurs in the system different components might need changing in order to alleviate the problem.

In the present embodiment the digital twin 2 is in communication with all of the sensors and sub-systems, such as the heat exchange, the controllable valves etc. As these sub-system may require different input standards the digital twin is adapted to provide the required input to the sub-system. The chatbot is preferable only connected to the control modules of the sub-system and not the sensor.

The input can be forwarded to the pump system directly from the digital twin or via the chatbot. This will depend on the situation at hand, both may be capable to translate the request into the suitable input format for the control modules.

In an example of a use of the embodiment, a user 4 request that the temperature of the room should be set at 22 degrees Celsius. The chatbot will retrieve from the sensor the current temperature and change the required parameters, optionally using the knowledge base module, and testing the prediction with the digital twin, changing the perimeters until the right setting is achieved. The digital twin may respond with a time estimate, a projected energy consumption etc., which will be presented to the user.

If a problem occurs in the system, the user 2 might ask the digital twin to diagnose the problem. This could be done though the chatbot. The chatbot 2 will prompt the user with requests to identify the problem and gather the required information. This could be through an AI-engine. The chatbot might use the knowledge base system to solve the problem, optionally testing the solution on the digital twin before sending the instruction to the user. The user will choose the solution, which, if possible, will be implemented by the Chatbot and if not, will present the user instruction to solve the problem or facilitate contact to the service hub.

The digital twin 2 will also monitor the pump system, using the sensors and alert the user when a problem is detected. This could for example occur if a sensor detects that the water temperature is low, compared to the expected, or there is no water pressure or circulation. This monitoring could be done using an AI-engine trained using the pump historical data. In such cases, the digital twin will alert the use, through the chatbot, using the third part communication platform.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCES USED

1 Pump system
2 Digital twin module
3 Chatbot agent
4 User
10 IoT database
11 data processing API of the digital twin module
12 Data connectivity module
13 Natural language understanding module
14 CRM module
15 Knowledge base module
16 Third party communication platform
17 Generic data
18 Specific data
19 Communication device
20 Pump
21 Sensor
22 Control module
23 Remote support service
24 Knowledge base module database
25 Valve
26 Exchange heater
27 Radiators
28 Room temperature sensor
29 Pipes
⟹ References a connection
⟶ References an element, such as a module, agent

The invention claimed is:

1. A computer implemented system configured for controlling and monitoring a pump system, the computer implemented system comprising:
   a pump system comprising at least one pump, at least one sensor configured for providing an operating state data signal representative of a mechanical, fluidically, electrical operating state and/or other system data of the at least one pump and a control module configured to control the mechanical, fluidically and/or operating state of the at least one pump in response to a received control signal;
   a digital twin module comprising a data processing Application Programming Interface (API) and an Internet of Things (IoT) database, said digital twin module being configured for retrieving said operating state data signal and store the data in the IoT data base, and said digital twin module being configured to communicate with a chat bot agent;
   said chatbot agent configured for being in data communication with the API of the digital twin module, a user and the pump system, and said chatbot agent configured to upon a request from the user:
      providing an actual or historical operating state of the at least one pump by use of the API of the digital twin module extracting from said information from said IoT database, and transmitting a control signal, representative of a parameter, to the pump system to set the at least one pump at a requested mechanical and/or electrical operating state;
   a data connectivity module configured for:
      receiving said operating state data signal from said at least one sensor and transmitting said operating state data signal to the digital twin module and the chatbot agent, and receiving said control signal from the chat bot agent and transmitting said control signal to the control module of the pump system; and
   a knowledge base module having a database, wherein the database is configured to store generic data and specific data, wherein the generic data contains generic information about a pump model and generic operational states of the at least one pump, the specific type data contains information specifically pertaining to the at least one pump, the information including at least one of a location, age and usage of the at least one pump, the knowledge base module is configured to provide to the chatbot agent generic and/or specific data by extracting data from or storing data in the database of the knowledge base module upon receiving a request from the chat bot agent.

2. The system according to claim 1, wherein the digital twin module further comprising a machine learning application, said machine learning application being trained on
   a numerical hydraulic/fluidly modelling of the pump system, or
   the at least one pump in its particular use, to predict expected values of mechanical, fluidically and/or electrical variable of the pump system or
   such variables of the at least one pump in its particular use, where such variables include predictions on expected values of such variables and classification of operating states of the at least one pump or the pump system in which it is used.

3. The system according to claim 1, wherein the chatbot agent is further configured for controlling the pump system autonomously based on algorithm(s) and/or machine learning application(s).

4. The system according to claim 1, wherein the chatbot agent and digital twin module are further configured for data communication with one or more of the following modules:
a natural language understanding module configured for converting the user input text or speech into a format suitable for execution by the digital twin module, a CRM module, a knowledge base module or third party communication platforms, such as Skype, Messenger, Facebook, chat platform, SMS, MSS service or other communication and social media.

5. The system according to claim 1, wherein the digital twin module contains metadata, stored in the IoT database, of that particular pump from which data is received, the metadata includes at least one of spatial position, model, total operational time, and specific application of the at least one pump.

6. The system according to claim 1, wherein the sensor of the pump system is selected from one or more of the following:
a differential pressure sensor (pressure head), a temperature sensor, a vibration sensor, a flow sensor, such as a volume flow sensor, an RPM sensor, a power sensor, a sound sensor, a water level sensor, a pH sensor, an ultrasonic sensor, an efficiency sensor, a vibration sensor, a turbidity sensor, a viscosity sensor, valve sensors.

7. The system according to claim 1, wherein the digital twin module sends multiple control signals to multiple control modules in order to change the setting of the pump system.

8. The system according to claim 1, wherein the chatbot agent is adapted to receive as input a contextual 3-d scan of the room and/or a scan of the temperature and/or scans of the labels of the pump system for identifying different subcomponents.

9. The method of using a system according to claim 1, the method comprising the steps of:
the digital twin module receiving from the pump system operating state data signal obtained by the sensor and being representative of an operating condition of the at least one pump,
the chatbot agent receiving the request from the user, the request being either
i) a request for an actual or historical operating state(s) or expected data of the at least one pump and/or the pump system, or
ii) a request for a specific mechanical, fluidically and/or electrical operating state of the at least one pump,
iii) a request for guidance, problem shooting and/or optimization, such as which flow setting the pump system should have, in case of i), the chatbot agent processes the request into an input to the digital twin module, and the digital twin module processes the input and provides to the chatbot agent the actual and/or historical operating state(s) by extracting data from the database;
in case of ii) the chatbot agent processes the request into input suitable for the control module;
in case of iii) the chatbot uses the knowledge based system or other modules to a answer the request, and, optionally, sends a request to the control module.

10. The method according to claim 9, wherein the digital twin module processes the input that includes at least one of a look up, extrapolation, interpolation, machine learning algorithm, and visualisation.

11. The method according to claim 9, wherein the output data from the digital twin module is one or more of: raw data, processed data from said at least one sensor that includes one or more of a graph, a picture, a possible command to the control module, and a video.

12. The method according to claim 11, wherein the chatbot agent is further configured for displaying a list of one or more possible actions based on the processed output and changes the settings of the pump system according to the user's choice of action.

13. The method according to claim 12, wherein the chatbot agent further communicates data with the knowledge base module, configured for processing the output from the digital twin module based on empirically obtained knowledge of the pump system that includes one or more of a laboratory test, prior application history of other pump systems, expect data based on the input from the chatbot, such as to produce a list of possible actions for the user for solving a possible operating error.

14. The method according to claim 9, wherein the chatbot agent is further configured for receiving and/or detecting inconsistencies from the pump system and communicates alarms to the user.

15. The method according to claim 9, wherein if the system fails to produce a solution then a connection to a Remote Support service is facilitated via the chatbot.

16. The method according to claim 9, wherein the digital twin module receives the pump system data from a data connectivity application and the chat bot sends the instructions for changing the settings of the pump system to the data connectivity application.

17. The method according to claim 9, wherein the machine learning algorithm is trained using a learning loop that includes one or more of an autonomously training loop, human feedback loop, multi-level feedback training.

18. The method according to claim 9, wherein the user, by use of a collection of imaging or a scanning device, scans the room and uses the data as input for the chatbot agent, either when prompted to by the chatbot agent or as a part of the set-up phase of the digital twin.

* * * * *